United States Patent [19]
Fitzpatrick et al.

[11] Patent Number: 5,675,708
[45] Date of Patent: Oct. 7, 1997

[54] AUDIO MEDIA BOUNDARY TRAVERSAL METHOD AND APPARATUS

[75] Inventors: Gregory P. Fitzpatrick, Keller; William J. Johnson, Flower Mound; Marvin L. Williams, Lewisville, all of Tex.

[73] Assignee: International Business Machines Corporation, Armonk, N.Y.

[21] Appl. No.: 172,003

[22] Filed: Dec. 22, 1993

[51] Int. Cl.$^6$ ................................................. G10L 3/00
[52] U.S. Cl. .............................. 395/2.79; 395/2.09
[58] Field of Search ............................ 395/2.12, 2.44, 395/2.69, 2.78, 2.79, 2.1, 2.09

[56] References Cited

U.S. PATENT DOCUMENTS

| | | | |
|---|---|---|---|
| 4,811,400 | 3/1989 | Fisher | 395/2.69 |
| 4,971,461 | 11/1990 | Kato et al. | 400/70 |
| 5,007,002 | 4/1991 | Imaizumi et al. | 364/519 |
| 5,040,129 | 8/1991 | Nishiyama | 364/519 |
| 5,051,925 | 9/1991 | Kadano et al. | 364/519 |
| 5,093,903 | 3/1992 | Sudoh et al. | 395/102 |
| 5,161,210 | 11/1992 | Druyvesteyn et al. | 395/2 |
| 5,171,093 | 12/1992 | Iwamoto et al. | 400/121 |
| 5,233,683 | 8/1993 | Sasaki | 395/110 |
| 5,245,600 | 9/1993 | Yamauchi et al. | 369/49 |
| 5,257,074 | 10/1993 | Kamei | 355/244 |
| 5,285,521 | 2/1994 | Holt et al. | 395/2.79 |
| 5,286,908 | 2/1994 | Jungleib | 84/603 |
| 5,313,556 | 5/1994 | Parra | 395/2.55 |
| 5,313,565 | 5/1994 | Mori | 395/118 |
| 5,314,256 | 5/1994 | Niwa | 400/61 |
| 5,371,854 | 12/1994 | Kramer | 395/2.79 |

OTHER PUBLICATIONS

"WordPerfect for DOS—Reference," Ver. 5.1, pp. 85–92, 1989.

EA Green, HH Nguyen, RP Pekowski, and O Perez "Code Page Specification for Both Source and Destination File" Research Disclosure, No. 319, publ. Nov. 1990.

GM Dolan, V Leith and RW Willis "Programmable Telecommunications Data Filter" Research Disclosure, No. 322, publ. Feb. 1991.

ML Williams "Conveying Conversion–With–Loss Prohibition" IBM Technical Disclosure Bulletin, vol. 33, No. 3A No. 3A, pp. 261, publ. Aug. 1990.

RJ Bolan, JR Carlock, JS Czyszczewski, EM Duttlinger, PT Go, RL Hinkle and JA O'Keefe "Method for Implementing Bidirectional Datastream Transforms" vol. 32, No. 12, pp. 338–341, publ. May 1990.

HH Nguyen and RP Pekowski "Assignment Scheme for Round Trip Integrity" IBM Technical Disclosure Bulletin, vol. 30, No. 10, pp. 93–95, publ. Mar. 1988.

JR Pienta "Method to Preserve Unrecognized Controls in Text Portion of a Document" IBM Technical Disclosure Bulletin, vol. 29, No. 7, pp. 3144–3145, publ. Dec. 1986.

(List continued on next page.)

*Primary Examiner*—Allen R. MacDonald
*Assistant Examiner*—Richemond Dorvil
*Attorney, Agent, or Firm*—Norman L. Gundel

[57] ABSTRACT

A method and data processing system are disclosed for audio media boundary traversal. In one embodiment, the invention transforms a multimedia data stream or file to an audio stream that is understandable to humans and then transforms the audio output back to the original multimedia data stream or file without loss of information. The embodiment processes an input file including both audio or audible, and non-audio components; writes the audio components to an output file; determines locations among the audio components of the non-audio components; transforms the non-audio components to audio components; writes the audio components and the locations of the non-audio components to the output file separately from the audio components; and produces an audio output file. The audio or audible components of the input file remain understandable by humans in the produced output. The embodiment also comprehends interpreting the audio output; transforming the audio sequences back to non-audio components and inserting the non-audio components among the audio components at the written locations; thereby recreating the original input file.

6 Claims, 3 Drawing Sheets

OTHER PUBLICATIONS

ML Gentry, AW Heath, VM Hoffman and TF Peebles "Character Set Change Minimization When AlternateCharacter is From a Proper Subset of the Home Keyboard Character Set" IBM Technical Disclosure Bulletin, vol. 28, No. 9, pp. 4070–4071, publ. Feb. 1986.

GM Bartlett "Conversion of Text Formatting Parameters" IBM Technical Disclosure Bulletin, vol. 27, No. 1A, pp. 134–135, publ. Jun. 1984.

PW Agnew, JJ Erhard, AM Gruhn and AS Kellerman "Preservation of Data Stream Controls Without Impact on Another Datastream's Integrity" IBM Technical Disclosure Bulletin, vol. 26, No. 6, pp. 2719–2720, publ. Nov. 1983.

JL Gaudet, HL Lineman and GH Neuman "Universal Print Level Data Stream" IBM Technical Disclosure Bulletin, vol. 26, No. 3B, pp. 1431–1432, publ. Aug 1983.

JR Featherston "Digital Encoding of Wide Range Dynamic Analog Signals" IBM Technical Disclosure Bulletin, pp. 2415–2417, publ. Nov. 1977.

Pending U.S. patent application S.N. 07/998,345, filed Dec. 30, 1992 by applicants herein.

1

AUDIO MEDIA BOUNDARY TRAVERSAL METHOD AND APPARATUS

BACKGROUND OF THE INVENTION

1. Field of the Invention

The present invention relates to the translation of data streams across differing media and in particular to the loss-less translation of multimedia data streams to and from audio media.

2. Description of the Related Art

Multimedia data is data that includes multiple media such as motion video, audio, graphics and text. Data streams containing multimedia data may be translated across differing media. Difficulties may arise when an intermediate media or the target media is not capable of representing some of the information. Translation algorithms have been developed to address some of these inadequacies. For example, a communications algorithm is used to convert an electronic data processing system file or data stream composed of eight bit characters into a seven bit transfer format that is useful when transferring data over a modem or line that only transfers seven bits. A receiver of this seven bit format may use a cooperative algorithm to convert the datastream back to an eight bit format.

Translation or conversion of multimedia data to and from an audio media presents particular problems. For example, the inclusion of format control, graphics and text in a complex document makes it difficult for a user to listen to an audio conversion of the textual portions of the document, through a text to speech process, while transmitting all of the document's other information in the same audio stream so that the audio stream alone is sufficient to reconstruct the original document. Translation or conversion of true multimedia information which is heterogeneous, such as audio (e.g.,compact disk music) and binary description information (e.g.,compact disk directory and attributes) along with video, also presents particular problems. There is no method for converting an entire compact disk (CD) containing both music information and non-music binary information into an audio stream so that the music can be heard correctly by an observer while only the same audio stream is utilized in reconstructing the entire original CD (music and miscellaneous binary information) without loss of information.

Much information found in multimedia data streams may not be intended for human ears and may not be meant for audio representation. Thus, the conversion of an arbitrary data stream to human discernible audio wherein said data stream contains some non-audio types of information involves a loss of data that cannot be recovered by translation from the audio back into the original data stream. Human discernible data is data that a human can both perceive and comprehend, such as audible music or speech.

To prevent data loss, arbitrary data may be translated into binary data. However, this method sacrifices a significant and potential advantage of the use of audio media for the human's ability to discern and understand discernible information content of the data.

Thus, there is a need for a method and apparatus for translating or converting multimedia data streams and files to and from audio media while preserving both the discernability of the human discernible output to the unaided human hear and also the integrity of the underlying data.

SUMMARY OF THE INVENTION

In accordance with the present invention, a method and data processing system are disclosed for audio media boundary traversal. In one embodiment, the invention transforms a multimedia data stream or file to an audio output that includes portions understandable to humans and then transforms the audio output back to the multimedia data stream without loss of information. The embodiment processes an input file that includes both audible entities (e.g., textual words or phrases, music, audio recordings, etc.) and non-audible entities (binary information for video, graphics, attributes, etc.) and writes the audible entities in digitized audio form to an output file; determines locations among the audible entities of the non-audible entities; transforms the non-audible entities to digitized audio sequences; writes the digitized audio sequences and the locations of the non-audible entities to the output file separately from the audible entities; and converts the entire digitized audio to an analog signal. The audible entities of the input file remain understandable by humans in the analog signal. The non-audible entities are preserved in the analog signal so that the entire original data stream can be reconstructed through utilization of only the analog signal. The embodiment also comprehends the analog signal and converts it back to digitized form; transforms the digitized audio and non-audio sequences back to the original data stream, thereby recreating the original input file.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
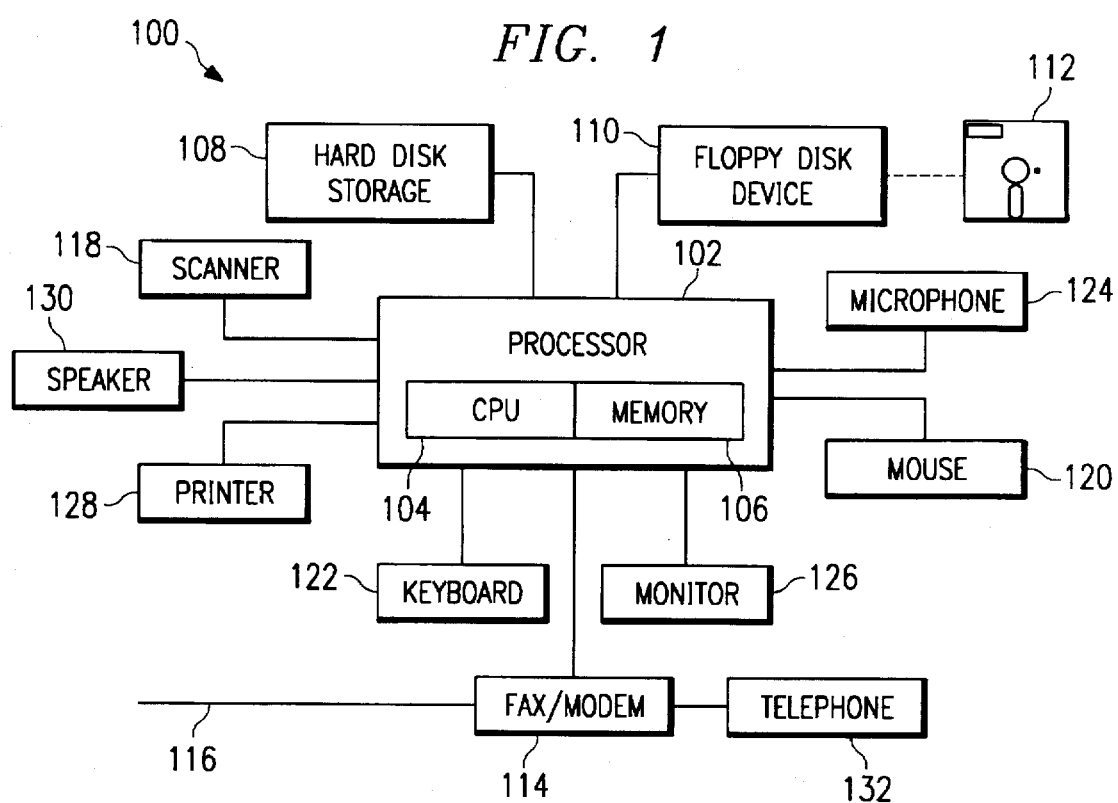
FIG. 1 is a block diagram of an apparatus used in performing the method of a preferred embodiment of the present invention and forming a part of the apparatus of a preferred embodiment of the present invention.

With reference now to the Figures, and in particular with reference to FIG. 1, there is shown, in block diagram form, an apparatus according to the present invention. The apparatus includes a data processing system 100. The data processing system 100 includes a processor 102, which includes a central processing unit (CPU) 104 and memory 106. Additional memory, such as a hard disk file storage 108 and a floppy disk device 110 may be connected to the processor 102. Floppy disk device 110 may write to or read from a removable diskette 112 which may have computer program code recorded thereon that implements portions of the present invention in the data processing system 100.

Inputs may also be received from a fax/modem 114, which is connected to a telephone line 116, and from a microphone 124. The data processing system 100 also includes user interface hardware, such as a mouse 120, a keyboard 122 and a scanner 118, for allowing user input to the processor 102. The data processing system 100 also includes visual display devices, such as a monochrome or color display monitor 126 and a monochrome or color display printer 128, for rendering visual information. The data processing system may also include an audio display device, such as a speaker 130 for rendering audio information. A telephone 132 may be connected to the telephone line 116 through the fax/modem 114.

Figure 2:
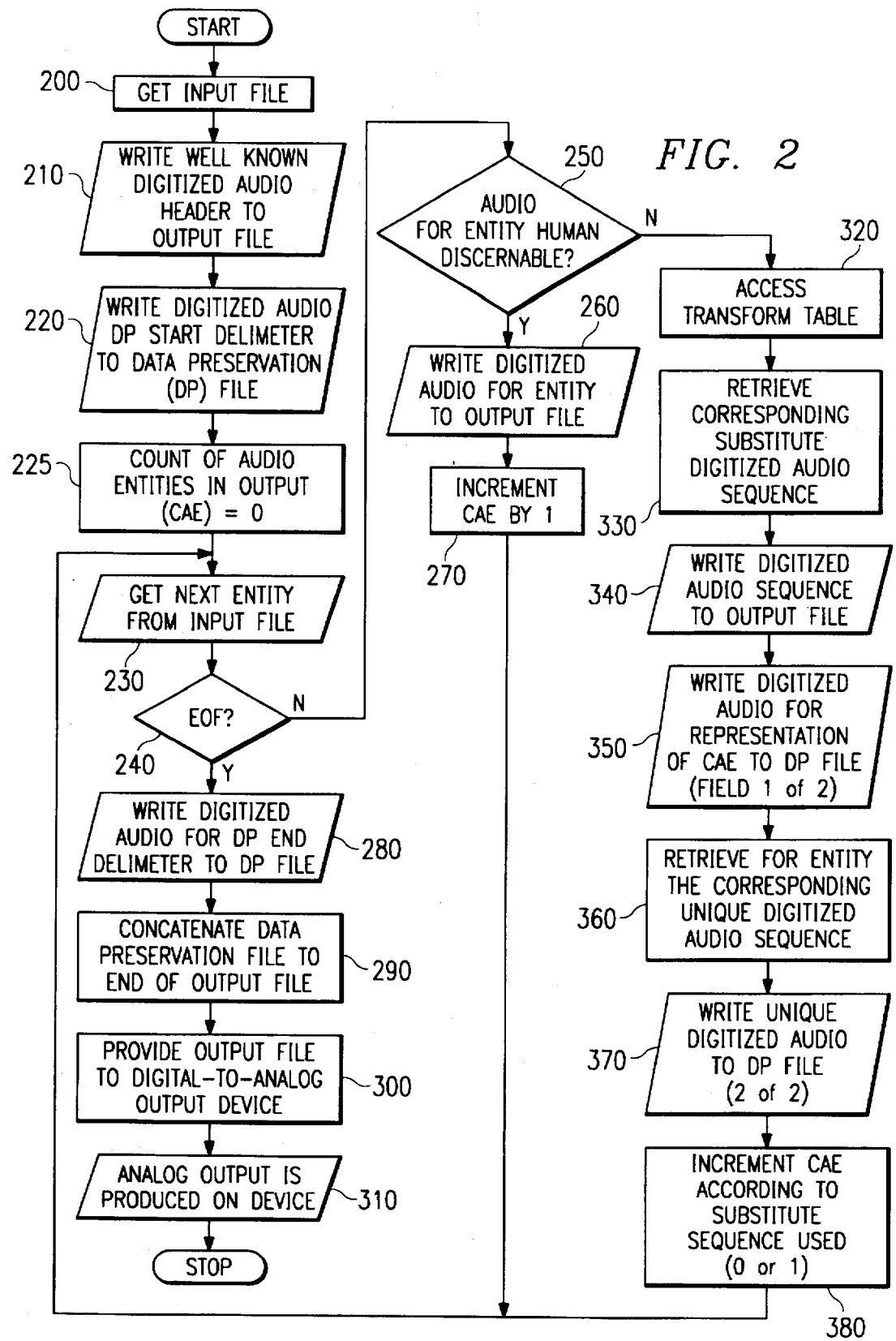
FIG. 2 is a high level logic flowchart illustrating the method of translating or converting a multimedia data stream or file to a purely audio media.

With reference now to FIG. 2, there is depicted a high level logic flowchart which illustrates the method of a preferred embodiment of the present invention for translating or converting a multimedia data stream or file to an audio media. The process begins at block 200 by getting the input file to be converted. The file should be understood to be either a file system file or a standard input device type of data stream file resulting from data input which contains multimedia information, a subset of which is audio that can be heard and understood by a human. The process then proceeds to block 210 and writes a well known digitized audio header to an output file. The presence of this header will identify the subsequent audio output as convertible to a multimedia data stream or file without loss.

The process then proceeds to block 220 and writes a digitized audio Data Preservation (DP) start delimiter to a Data Preservation (DP) file. The process then proceeds to block 225 and defines the variable, Count of Audible Entities (CAE) in output file, equal to zero. The variable CAE will be used to provide an offset, with respect to human discernible audio entities, which is a location within the output file of each non-audio entity occurring among audio entities from the input file. It is important to understand that audio entities (i.e., human discernible entities) are separable through either a very brief moment of silence or a tone which is not detectable to the human ear but is detectable to a microphone device. Either method may be used to separate audio entities thereby providing a CAE offset means.

The process then proceeds to block 230 and gets the next or first entity from the input file. Those skilled in the art will appreciate that the term entity is used broadly. An entity may be a textual word, textual phrase, graphic element, video element, audio element, binary data, or the like, or subset thereof. Various embodiments may break a multimedia data stream into small atomic entities (e.g., individual bytes) or complex conjunctive entities. The only requirement is that an entity is either human discernible audio or something which can be represented in a transform table for comparison. The process then proceeds to block 240 and checks whether all entities have been processed from the input file. If yes, the process proceeds from block 240 to block 280.

Returning to block 240, if an end-of-file delimiter is not encountered, the process proceeds from block 240 to block 250 for a determination of whether the entity retrieved is human discernible. A human discernible entity is an audio sound, a text word which can be converted to a spoken word, a text phrase which can be converted to a spoken phrase, music, or any sound which is natural for a human to hear and understand. Thus, input entities such as a video element, a graphical element, a document format control (e.g., spaces, tab, carriage return, line feed, etc.) or any binary data not natural for a human to hear are considered non-audio entities or entities which are not human discernible.

If it is determined in block 250 that the entity is human discernible, the process proceeds from block 250 to block 260 and writes the associated digitized audio to the output file. The process then proceeds to block 270 and increments the variable CAE by one. It should be understood that block 260 appropriately delimits the digitized audio with either the brief moment of silence or a brief digitized sound not detectable to the human ear. The process then returns to block 230, as described above.

Returning to block 250, if it is determined that the entity is not a human discernible entity, the process proceeds to block 320 and accesses the transform table. The same transform table is used by various data processing systems embodying the present invention. The transform table includes a record for each entity which is not discernible to a human. For example, each byte representation of an arbitrary binary segment may have an associated audio tone or audio sequence.

There are three fields in each record of the transform table. One field contains the non-audio (i.e., not human discernible) entity. The second field contains a unique sequence of digitized audio that is associated with the non-audio entity. The third field contains an optionally used substitute digitized audio sequence. This substitute digitized audio sequence may include a spoken word or phrase such as "LOGO EMBEDDED" to be intermingled with the audio entities. This allows the human to know where in the human discernible stream certain non-audio constructs occurred. The substitute digitized audio sequence field is null most of the time because substitutes would clutter the human discernible audio with entities which are undesirable for hearing in most cases. Substitute digitized audio may vary in length. Block 320 proceeds to block 330 where the substitute sequence is retrieved. Because the substitute sequence is null for most practical embodiments, a transform table which only contains two fields may be used.

The process then proceeds from block 330 to block 340 and writes to the output file any substitute digitized audio sequence for the retrieved non-audio entity. The process then proceeds to block 350 and writes the current value of the CAE variable to the data preservation file as the first field of a record having two fields. The process then proceeds to block 360 and retrieves from the transform table the unique digitized audio sequence there associated with the non-audio entity. The process then proceeds to block 370 and writes the unique digitized audio sequence to the data preservation file as the second field of the two field record.

The process then proceeds to block 380 and increments the CAE variable. An increment of 0 is performed if the substitute digitized audio field was null. Otherwise, and increment of 1 is performed. It should be understood that any substituted digitized audio as the result of block 340 is appropriately delimited by either a brief moment of silence or a brief tone not detectable to the human ear as described above.

The process then proceeds from block 380 to block 230 as described above and retrieves the next entity from the input file, as described above.

Returning now to block 240, if, after retrieving the next entity from the input file in block 230, it is determined in block 240 that the end-of-file delimiter is encountered, the process proceeds from block 240 to block 280. In block 280, the process writes a digitized audio data preservation end delimiter to the data preservation file. The process then proceeds to block 290 and concatenates the data preservation file to the end of the output file. Alternatively, the data preservation file may be concatenated to the front of the output file. The process then provides the output file to a digital to analog device in block 300 and then the analog is played on an analog output device such as a speaker in block 310. When all audio is played, the process terminates.

Thus, an arbitrary multimedia data stream was converted into a purely audio signal with human discernible elements maintained as human discernible, such that a loss of information will not occur provided a complementary audio receiving algorithm is employed. It should be noted that an alternative embodiment, within the scope of the present invention, may not implement an intermediate digitized audio file, provided the hardware processes efficiently, in which case the audio output of block 310 is produced during real time output of audio entities.

Figure 3:
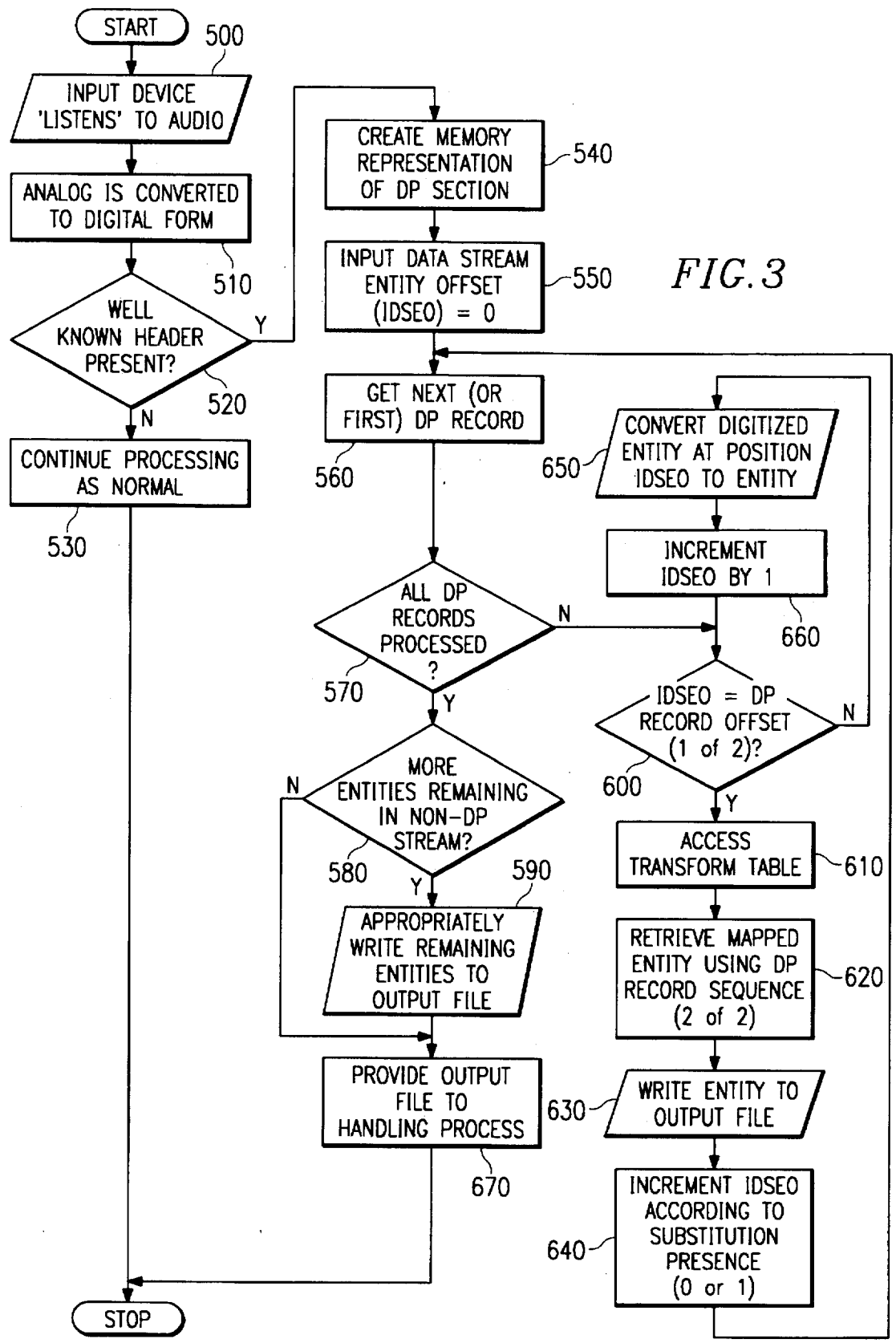
FIG. 3 is a high level logic flowchart illustrating the method of translating or converting the purely audio media back to the original multimedia data stream or file without loss of information.

With reference now to FIG. 3, there is depicted a high level logic flowchart which illustrates the method of a preferred embodiment of the process for transforming or converting the purely audio signal to the original multimedia data stream or file. The process begins at block 500 by receiving an analog transmission, wherein the human discernible portions remain discernible. The process then proceeds to block 510 where the analog is converted to digital form. Those skilled in the art will appreciate that knowledge in block 510 of how the digitized audio was transmitted into analog by FIG. 2 makes for accurate analog to digital conversion by block 510. The process then proceeds from block 510 to block 520 for a determination of whether the audio stream begins with the well known header that identifies output created by the process of the present invention. If no, the process proceeds to block 530 and processes the digitized audio as normal. The process then terminates.

Returning to block 520, if the process detects the presence of the well known header that identifies an output created by the present invention, the process proceeds from block 520 to block 540 and creates a memory representation of the data preservation section that comprises the non-audio (i.e., human indiscernible) portions of the received audio. This constitutes the data preservation file that was concatenated to the end of the output file in block 290 of FIG. 2. It is bounded by the data preservation start delimiter written in block 220 and the data preservation end delimiter written in block 280 of FIG. 2. The process then proceeds from block 540 to block 550 and defines a variable, Input Data Stream Entity Offset (IDSEO), equal to zero.

The process then proceeds from block 550 to block 560 and gets the next, or the first, record from the data preservation section. As will be recalled, each data preservation record has two fields, written in blocks 350 and 370, respectively, of FIG. 2. As will be recalled, the first field of each record is the value of the variable CAE at the location of a non-audio entity. The second field is the unique digitized audio sequence associated with that location.

The process next proceeds from block 560 to block 570 for a determination of whether the next data preservation record is the data preservation end delimiter written in block 280, that is, whether all data preservation records have now been processed. If not, the process proceeds from block 570 to block 600.

In block 600, the process determines whether the variable IDSEO is equal to the first field of the data preservation record, which is the data preservation record offset written in block 350 of FIG. 2. If no, the process proceeds from block 600 to block 650, as the process has not yet reached the point in its output file where the next non-audio sequence is to be inserted. In block 650, the process writes to the output file the entity associated with IDSEO and the digitized audio. For example, the spoken word or phrase would be converted back into textual form. The process then proceeds from block 650 to block 660 and increments the variable IDSEO by one. The process then returns to block 600. It should be understood that block 650 is capable of deciphering entities as delimited by the brief moment of silence or undetectable tone as described in FIG. 2 discussions above.

In block 600, if it is determined that the variable IDSEO is equal to the value of the first field, the data preservation record offset of the current data preservation record, the process proceeds from block 600 to block 610. This determination signifies that the next data sequence to be inserted in the output file is one that was non-audio in nature and processed by blocks 320 through 380 of FIG. 2.

In block 610, the process accesses the same transform table used by FIG. 2 except that FIG. 3 uses the digitized audio sequence for performing the comparison in order to produce the correct output entity. The process then proceeds to block 620 and the second field of the current data processing record, the unique digitized audio sequence written in block 360 of FIG. 2, is used to retrieve from the transform table the mapped entity which was originally converted. The process then proceeds from block 620 to block 630 and writes the retrieved non-audio entity to the output file. The process then proceeds from block 630 to block 640 and determines, from the transform table, whether or not a substitution entity was placed into the audio stream. Block 640 will increment by 0 if no substitution had been made and will increment by 1 if an entity was placed into the output stream. The process then proceeds from block 640 to block 560, described above, to get the next data preservation record.

Returning to block 570, if it is determined that all data preservation records have been processed, as described above, the process proceeds from block 570 to block 580. In block 580, it is determined whether there are more entities to convert back to the original stream. If no, the process proceeds to block 670. If yes, the process proceeds from block 580 to block 590 and writes to the output file the remaining audio entities into their associated pre-audio form. The process then proceeds to block 670. In block 670, the process provides the output file to the data processing system and terminates.

While the invention has been particularly shown and described with reference to a preferred embodiment and process, it will be understood that various changes in form and detail may be made therein without departing from the spirit and scope of the invention.

What is claimed is:

1. A method, performed in a data processing system, for transforming an input multimedia data stream, which includes audible entities intermingled with non-audible entities such as binary information for video, graphics, and attributes, said audible entities being understandable by humans, such as spoken words or phrases, music, and audio recordings, to an audio output that includes portions understandable to humans, the method comprising the computer implemented steps of:

writing the audible entities of the input multimedia data stream to an output file;

determining offsets of the intermingled non-audible entities of the input multimedia data stream among the audible entities of the input multimedia data stream;

transforming the non-audible entities of the input multimedia data stream to audio sequences;

transforming the offsets of the non-audible entities of the input multimedia data stream to audio sequences;

writing the audio sequences to the output file separately from the audible entities written to the output file; and converting the output file to an audio signal with the audio sequences separate from the audible entities in the audio signal so that the audible entities of the input file remain understandable by humans in the audio signal and so that the entire original data stream can be reconstructed from the audio signal.

2. The method of claim 1, further comprising the computer implemented steps of:

transforming the audio sequences of the audio signal back to offsets among the audible entities and non-audible entities; and writing the transformed non-audible entities among to the audible entities of the audio signal at the transformed offsets among the audible entities so as to recreate the input multimedia data stream.

3. A data processing system, for transforming an input multimedia data stream, which includes audible entities intermingled with non-audible entities such as binary information for video, graphics, and attributes, said audible entities being understandable by humans, such as spoken words or phrases, music, and audio recordings, to an audio output that includes portions understandable to humans, the data processing system comprising:

means for writing the audible entities of the input multimedia data stream to an output file;

means for determining offsets of the intermingled non-audible entities of the input multimedia data stream among the audible entities of the input multimedia data stream;

means for transforming the non-audible entities of the input multimedia data stream to audio sequences;

means for transforming the offsets of the non-audible entities of the input multimedia data stream to audio sequences;

means for writing the audio sequences to the output file separately from the audible entities written to the output file; and means for converting the output file to an audio signal with the audio sequences separate from the audible entities in the audio signal so that the audible entities of the input file remain understandable by humans in the audio signal and so that the entire original data stream can be reconstructed from the audio signal.

4. The data processing system of claim 3, further comprising:

means for transforming the audio sequences of the audio signal back to offsets among the audible entities and non-audible entities; and means for writing the transformed non-audible entities among to the audible entities of the audio signal at the transformed offsets among the audible entities so as to recreate the input multimedia data stream.

5. A computer program product, for transforming an input multimedia data stream, which includes audible entities intermingled with non-audible entities such as binary information for video, graphics, and attributes, said audible entities being understandable by humans, such as spoken words or phrases, music, and audio recordings, to an audio output that includes portions understandable to humans, the computer program product comprising:

a computer usable medium having computer readable program code embodied in said medium, said computer program product including:

computer readable program code means for writing the audible entities of the input multimedia data stream to an output file;

computer readable program code means for determining offsets of the intermingled non-audible entities of the input multimedia data stream among the audible entities of the input multimedia data stream;

computer readable program code means for transforming the non-audible entities of the input multimedia data stream to audio sequences;

computer readable program code means for transforming the offsets of the non-audible entities of the input multimedia data stream to audio sequences;

computer readable program code means for writing the audio sequences to the output file separately from the audible entities written to the output file; and computer readable program code means for converting the output file to an audio signal with the audio sequences separate from the audible entities in the audio signal so that the audible entities of the input file remain understandable by humans in the audio signal and so that the entire original data stream can be reconstructed from the audio signal.

6. The computer program product of claim 5, further comprising:

computer readable program code means for transforming the audio sequences of the audio signal back to offsets among the audible entities and non-audible entities; and computer readable program code means for writing the transformed non-audible entities among to the audible entities of the audio signal at the transformed offsets among the audible entities so as to recreate the input multimedia data stream.

* * * * *